INVENTORS
JIMMIE E. WARTHAN AND
ALARICO A. VALDETTARO
by
Mason, Kolehmainen,
Rathburn and Wyss
ATTORNEYS.

TUNING SCREW RETAINER ARRANGEMENT FOR TURRET TYPE TELEVISION TUNER

Filed Jan. 2, 1964

INVENTORS
JIMMIE E. WARTHAN AND
ALARICO A. VALDETTARO
by Mason, Kolehmainen, Rathburn and Wyss
ATTORNEYS.

INVENTORS
JIMMIE E. WARTHAN AND
ALARICO A. VALDETTARO

Mason, Kolehmainen,
Rathburn and Wyss
ATTORNEYS.

May 3, 1966 J. E. WARTHAN ETAL 3,249,902

TUNING SCREW RETAINER ARRANGEMENT FOR TURRET TYPE TELEVISION TUNER

Filed Jan. 2, 1964 4 Sheets-Sheet 4

INVENTORS
JIMMIE E. WARTHAN AND
ALARICO A. VALDETTARO
by Mason, Kolehmainen, Rathburn and Wyss.
ATTORNEYS.

United States Patent Office 3,249,902

Patented May 3, 1966

3,249,902

TUNING SCREW RETAINER ARRANGEMENT FOR TURRET TYPE TELEVISION TUNER

Jimmie E. Warthan, Stinesville, and Alarico A. Valdettaro, Bloomington, Ind., assignors to Sarkes Tarzian, Inc., Bloomington, Ind., a corporation of Indiana Filed Jan. 2, 1964, Ser. No. 334,975
20 Claims. (Cl. 334—50)

The present invention relates to television tuners of the turret type, and, more particularly, to an arrangement for retaining the oscillator adjustment screws of individual tuning panels in a turret tuner in their respective adjusted positions.

In turret type television tuners certain arrangements have heretofore been proposed for positioning the individual tuning panels or sticks of the turret tuner for correct alignment with the stator contacts of the tuner while at the same time providing means for readily removing the tuning panels on an individual basis. One such arrangement is shown, for example, in a copending application of James E. Krepps and Morton Weigel, Serial No. 120,440, filed June 28, 1961, and assigned to the same assignee as the present invention. In the turret tuner arrangement described in the above identified copending application the oscillator coils which are wound around a portion of each tuning panel or stick, are each provided with an adjustment screw which is adjustably mounted in one end of the stick and extends therefrom. In order to hold these oscillator adjustment screws in their respective adjusted positions individual mounting clips are provided for each stick which engage the threads of the adjustment screw and hold the same in adjusted position. These retaining clips must be individually assembled to each stick and considerable labor is required to incorporate them into the turrent assembly.

It is, therefore, an important object of the present invention to provide an arrangement for retaining the oscillator adjustment screws of a turret type television tuner which is simple in construction and may be readily manufactured on a mass production basis.

It is another object of the present invention to provide a unitary device for retaining the individual oscillator adjustment screws of a turret type television tuner whereby spring tension may be applied to each oscillator adjustment screw to hold the same in adjusted position.

It is a further object of the present invention to provide a new and improved turret tuner arrangement wherein a unitary device is employed to provide spring tension for all oscillator adjustment screws while at the same time permitting ready removal of the individual tuning sticks of the turret without interference from the spring biasing means.

The invention, both as to its organization and method of operation, together with further objects and advantages thereof, will best be understood by reference to the following specification taken in connection with the accompanying drawings, in which.

Figures 1, 2, 5:
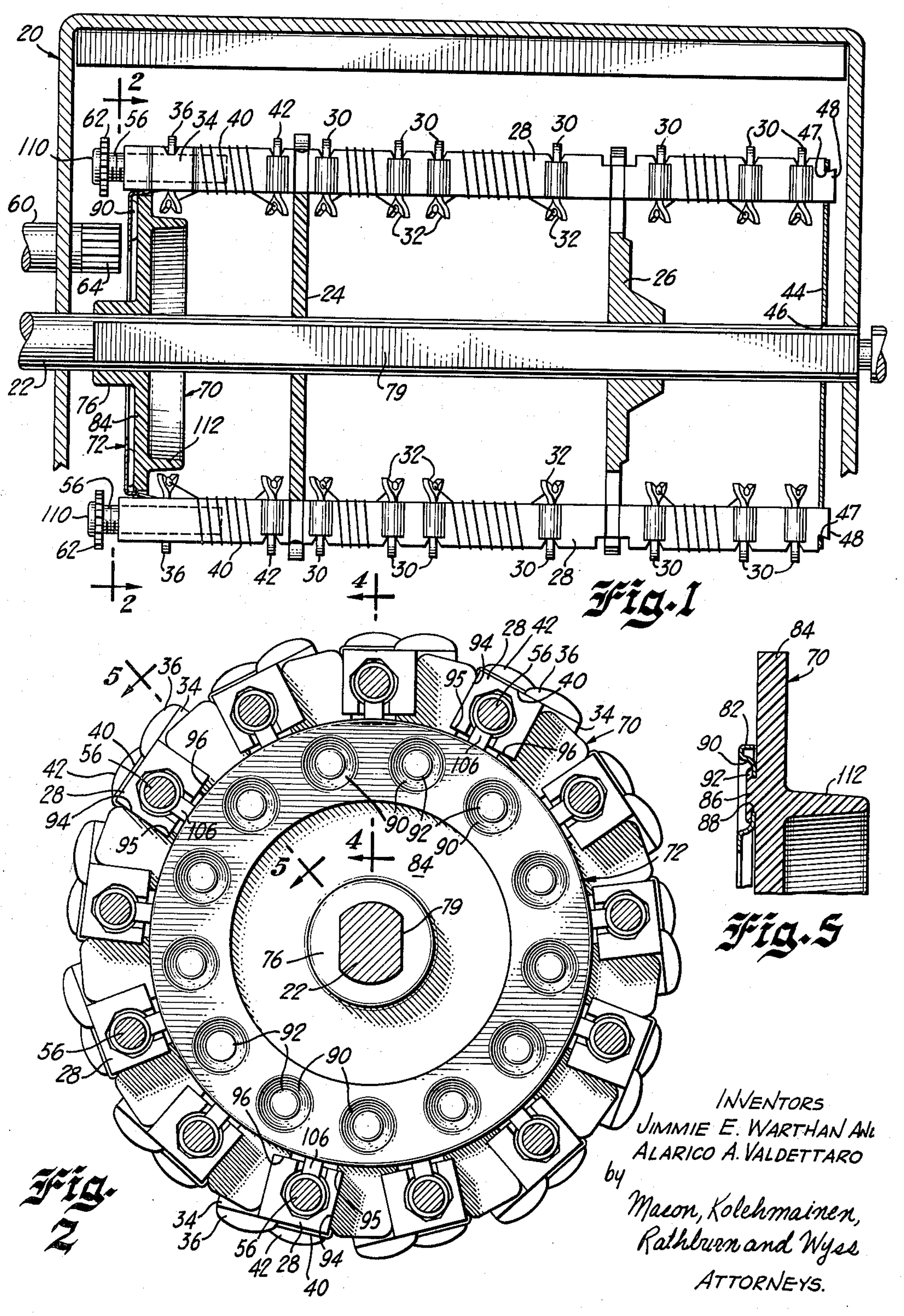
FIG. 1 is a sectional side elevational view of a turret type television tuner embodying the features of the present invention.
FIG. 2 is a sectional view taken along the lines 2—2 of FIG. 1.
FIG. 5 is a fragmentary sectional view, on an enlarged scale, taken along the lines 5—5 of FIG. 2.

Referring now to the drawings, and more particularly to FIGS. 1 to 8, inclusive, thereof, the turret type television tuner in which the features of the present invention are incorporated is therein illustrated as comprising a U-shaped tuner frame indicated generally at 20 within which is rotatably mounted a main station selector shaft 22. A pair of stick positioning discs 24 and 26 are mounted on the selector shaft 22 at points intermediate the ends of the tuning sticks and are provided with peripheral notches which are adapted to receive a series of 13 tuning sticks such as the stick 28. The tuning sticks which are thus positioned around the periphery of the positioning discs 24 and 26 form a rotatable turret structure which may be rotated to different positions corresponding to the different television channels by means of the selector shaft 22. Any suitable means may be employed to detent the shaft 22 in the correct channel selecting position.

The tuning sticks 28 carry a number of oval-headed contact members 30 which are provided with bifurcated end portions 32 which receive the ends of wires wound around the stick 28 to form the various tuning coils of each tuning stick. Each tuning stick is provided with an offset portion 34 (FIG. 7) which has a contact member 36 therein and an oscillator tuning coil 40 is wound around the forward portion of the stick 28, one end of this oscillator tuning coil being connected to the contact 36 and the other end thereof being connected to the adjacent contact 42 (FIG. 1). The individual tuning sticks 28 may be constructed and manufactured in the manner described in detail in the above identified copending application of Krepps and Weigel, and reference may be had to this copending application for further description of the tuning sticks themselves.

The rear positioning disc 26 functions only to position the tuning sticks 28 peripherally and longitudinally and does not prevent the sticks from radially outward movement. In order to retain the rear end of the sticks against outward movement, there is provided an end retainer disc 44 which is provided with a clearance opening 46 for the tuning shaft 22 and is provided with a series of openings 47 (FIG. 1) near the periphery thereof which are adapted to receive the recessed end portions 48 of the tuning sticks 28.

The forward positioning disc 24 is arranged to retain the forward end of the stick against radial outward movement as well as positioning this portion of the stick against peripheral and longitudinal movement. Thus, referring to FIG. 6, the disc 24 is provided with slots 50 between each stick position which define a pair of arm portions 52 which are adapted to engage opposite sides of the sticks 28. The arms 52 are provided with inwardly extending projections or shoulders 53 which project over the upper edge of the stick 28 and function to retain the forward end of the stick against radially outward movement.

Each of the oscillator tuning coils 40 of the individual tuning sticks 28 is arranged to be adjusted in inductance value by means of an adjustable element. More particularly, each of the tuning sticks 28 is provided with an opening 55 extending inwardly from the forward end thereof to a depth at least equal to the length of the tuning coil 40 and a tuning element in the form of a threaded screw 56 is inserted into the opening 55. In the illustrated embodiment the individual oscillator adjustment screws 56 of the tuning sticks 28 are arranged to be individually adjusted from a common fine tuning shaft 60 (FIG. 1). More particularly, the forward end of each of the tuning screws 56 is provided with a small pinion gear portion 62 which is adapted to be engaged by corresponding teeth 64 on the fine tuning shaft 60 when this shaft is moved upwardly into engagement therewith. Any suitable arrangement may be employed to cause translational motion of the shaft 60 in response to rotation of the fine tuning knob of the tuner. For example, an arrangement such as shown in the copending application of Joe G. Badger, Serial No. 259,528, filed February 19, 1963, may be employed to actuate the fine tuning shaft 60 so that the oscillator adjustment screws 56 may be individually adjusted as they are moved to the active position of the turret.

In order to retain the oscillator screws 56 in their respective adjusted positions, there is provided in accordance with the present invention a disc member indicated generally at 70 (FIG. 3) and an annular sheet metal member indicated generally at 72 which is provided with a plurality of resilient spring arms 74. The disc member 70 is arranged to be mounted on the selector shaft 22 by means of a hub portion 76 provided with an opening 78 which is shaped to conform to the flat surfaces 79 and 80 formed on the selector shaft 22 so that the disc 70 is secured to and rotates with the shaft 22. The annular member 72 is provided with a rim portion 82 which gives rigidity to the member 72. The disc member 70 is provided with a series of bosses 86 which project from the forward surface 84 thereof and are arranged to extend through a corresponding series of opening 88 in the member 72 when the members 70 and 72 are assembled together. The member 72 is also provided with a series of depressions or dished out portions 90 adjacent the openings 88 which function to space the member 72 away from the supporting surface 84 of the disc member 70. Preferably the edge of the rim 82 is also spaced a few thousandth of an inch away from the surface 84 so as to permit maximum flexing of the radially extending arm 74 and the contiguous portion of the member 72. Also, the supporting portions 90 are spaced intermediate the positions of the radial extending arms 74 to permit maximum flexibility of the latter. The disc member 70 is preferably made of a suitable plastic material such as a thermoplastic polycarbonate resin and after the member 72 is assembled on the bosses 86 the end portions of these bosses are flattened in any suitable manner known in the art to produce the headed portions 92 thereof (FIG. 5) which securely support the member 72 at spaced points on the surface 84. By supporting the member 72 at spaced points near the periphery of the member 70 the flexible arm portions 74 are effectively isolated from one another and the member 72 is prevented from buckling so that all spring fingers exert substantially the same bias on their respective tuning screws.

The disc member 70 is provided with a series of peripheral notches 94 which are adapted to receive the forward ends of the tuning coil sticks 28. The notches 94 are provided with shoulders 95 and 96 which define a groove or channel 98 below the underside of the tuning stick 28 through which the arm 74 extends. The forward end of each of the tuning sticks 28 is provided with a bottom opening slot 100 through which each of the radially extending spring arms 74 extends and the arms 74 are spring biased upwardly so as to urged the respective oscillator adjustment screws 56 against the top wall of the opening 55 in the end of the tuning stick.

Figures 3, 4, 6, 7, 8:
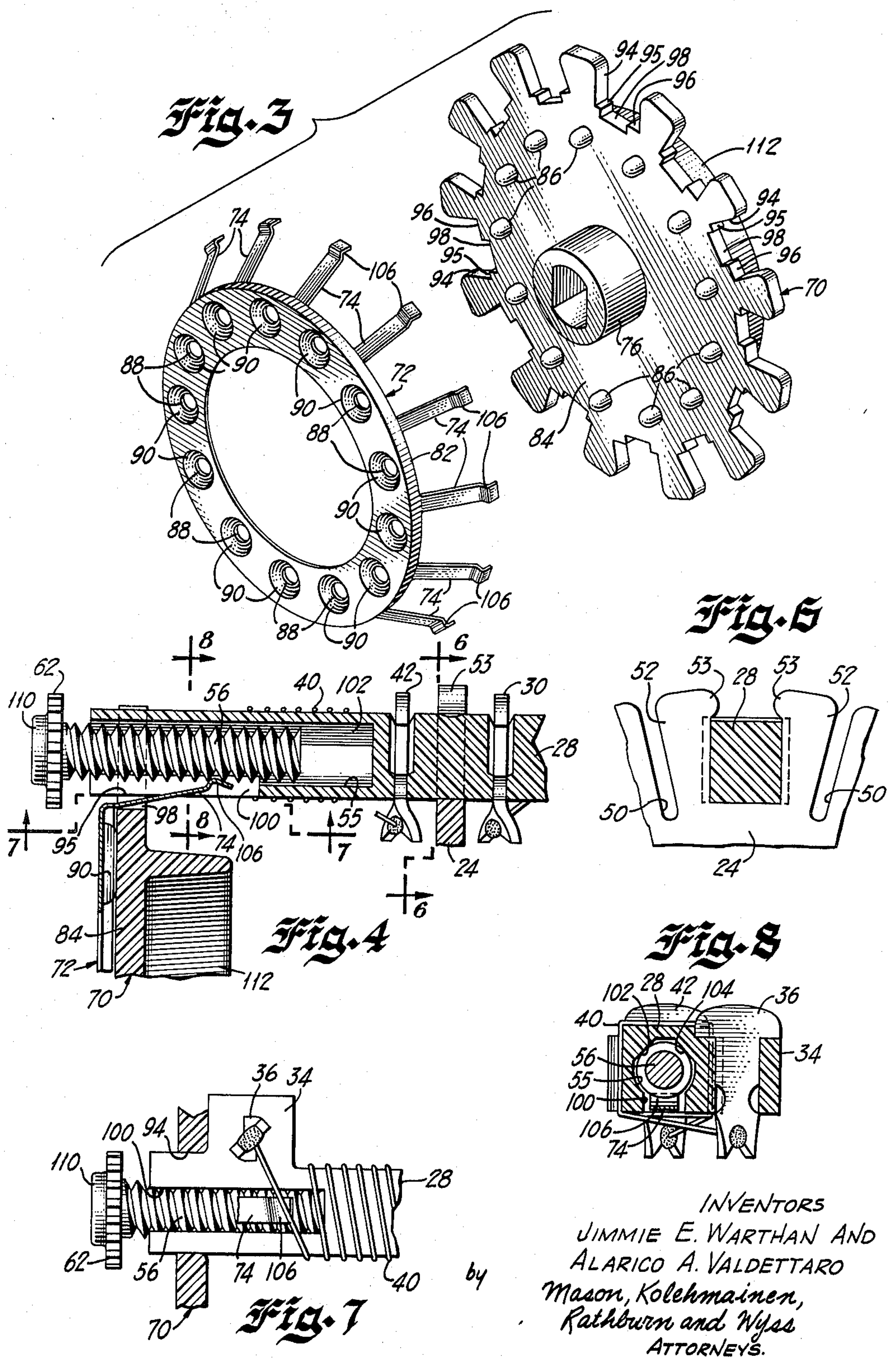
FIG. 3 is an exploded perspective view showing the tuning screw retainer arrangement employed in the tuner of FIG. 1.
FIG. 4 is a sectional view taken along lines 4—4 of FIG. 2 on a somewhat larger scale.
FIG. 6 is a sectional view taken along the lines 6—6 of FIG. 4.
FIG. 7 is a sectional view taken along the lines 7—7 of FIG. 4.
FIG. 8 is a sectional view taken along the lines 8—8 of FIG. 4.

In order to provide for accurate positioning of the tuning screw 56, the opening 55 is provided with a pair of inclined upper wall portions 102 and 104 which are so arranged that the threads of the tuning screw 56 ride on the inclined walls 102 and 104 which act as bearing surfaces. With this arrangement tolerance or play of the adjustment screw 56 is eliminated since the spring arm 74 urges the adjustment screw 56 against the surfaces 102 and 104 which act as V-type bearing surfaces. The end portion of each of the spring arms 74 is formed to provide a thread-following shoulder 106 which rides in the thread of the adjustment screw 56, as best illustrated in FIG. 4, and functions to hold the adjustment screw 56 accurately in its adjusted position. The shoulder 106 is preferably slanted so as to conform with the pitch of the threads of the adjustment screw 56, as best illustrated in FIG. 7.

From the foregoing description it will be seen that the arrangement of the present invention provides a unitary device which is capable of functioning to provide the resilient bias necessary to hold all of the oscillator adjustment screws of the individual tuning sticks 28 in their respective adjusted positions. If any one of the adjustment screws 56 is rotated inwardly to a point where the gear portion 62 thereof strikes the end of the stick 28 or the end of the screw 56 reaches the bottom of the opening 55, the spring arms 74 will flex sufficiently to permit the shoulder 106 thereof to ride over the screw threads so that jamming is prevented and damage to the tuning screw 56 is avoided. In the same manner, outward travel of the tuning screw 56 is limited by engagement of the head portion 110 thereof with the front wall of the tuner chassis 20, the arm 74 again flexing to ride over the screw thread. It will also be noted that the arrangement of the present invention whereby the tuning screws 56 are held against the bearing surfaces 102 and 104 by means of the spring arms 74 which project through the bottom opening slots 100 in the tuning sticks, permits each tuning stick to be individually removed from the turret assembly without interference from the spring biasing means which is employed to hold the oscillator screw 56 thereof in adjusted position. Thus, if it is desired to remove a particular stick from the turret assembly, the forward end thereof is merely lifted upwardly with sufficient force to flex the arm portions 52 of the positioning disc 24 so that the stick is moved outwardly beyond the shoulders 53 and as this occurs the oscillator screw 56 is merely lifted upwardly out of contact with the corresponding spring arm 74. The tuning stick is then moved forwardly by an amount sufficient so that the rear end 48 thereof clears the opening 47 in the end disc 44 and the tuning stick may then be removed for servicing, repair or replacement. In the same manner when a new stick is to be inserted in the turret assembly, the above procedure is simply reversed and as the forward end of the stick is snapped into place in the positioning disc 24 the corresponding spring arm 74 engages the oscillator screw 56 and exerts the desired spring bias thereon.

The spring arms 74 are somewhat elongated and hence can rather easily be bent out of shape prior to assembly in the turret structure. To prevent such damage to the arms 74, the disc member 70 is provided with a rearwardly extending annular flange 112 which projects beyond the ends of the spring arms 74 when these arms are in their unflexed position. Accordingly, after the members 70 and 72 have been assembled and are waiting to be positioned on the selector shaft 22, damage to the spring arms 74 is prevented by means of the protective flange 112 which prevents weight from being exerted on the tips of the spring arms 74.

In the embodiment of FIGS. 9 to 12, inclusive, an arrangement is provided whereby the positioning disc 24 of the embodiment of FIG. 1 is eliminated. To this end, the disc member 70*a* is secured to the selector shaft 22 at such position to engage the extreme forward ends of the tuning sticks 28. The disc member 70*a* has secured thereto the annular member 72*a* provided with spring arms for individual bias of the oscillator adjustment screws of the sticks 28. The members 70*a* and 72*a* are similar in most respects to the members 70 and 72 described in detail heretofore in connection with the embodiment of FIG. 1. However, the disc member 70*a* is provided with narrow radial slots 120 which extend inwardly from the periphery thereof to a point below the depth of the grooves 98*a* so that the adjacent arm portions 122 and 123 of the member 70*a* are somewhat resilient. Inwardly extending shoulders 124 and 125 are formed at the upper ends of the arms 122 and 123 which function to hold the forward end of the stick 28 in place. Thus, in the embodiment of FIGS. 9 to 12, inclusive, the disc member 70*a* functions accurately to position the forward end of the tuning sticks 28 both peripherally and longitudinally and also functions to restrain the forward end of these sticks against radially outward movement. In other respects the members 70*a* and 72*a* are identical to that described in detail heretofore and corresponding parts thereof have been given the same reference numerals with the additional identification "*a*" added thereto.

Figure 9:
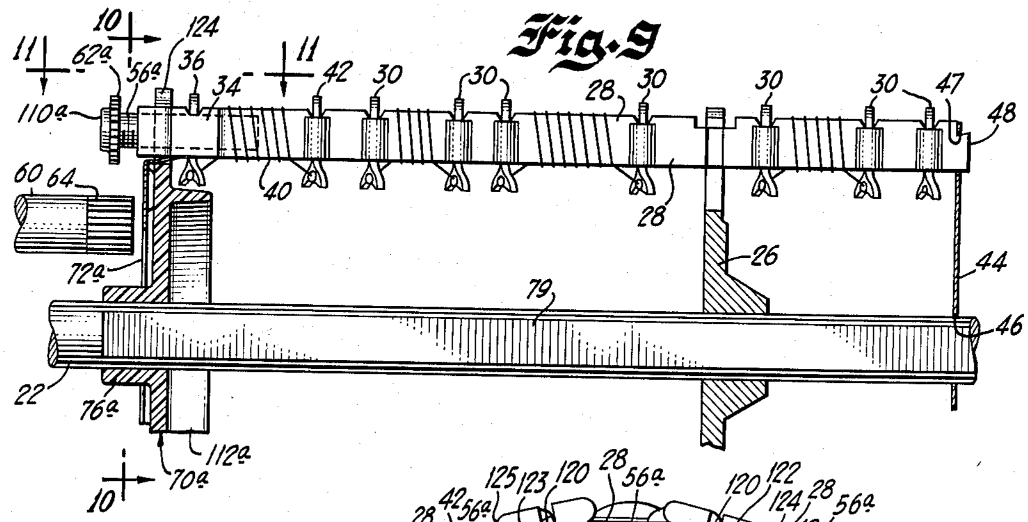
FIG. 9 is a fragmentary side elevational view of a turret tuner arrangement embodying a different form of tuning screw retainer according to the present invention.
Figure 10:
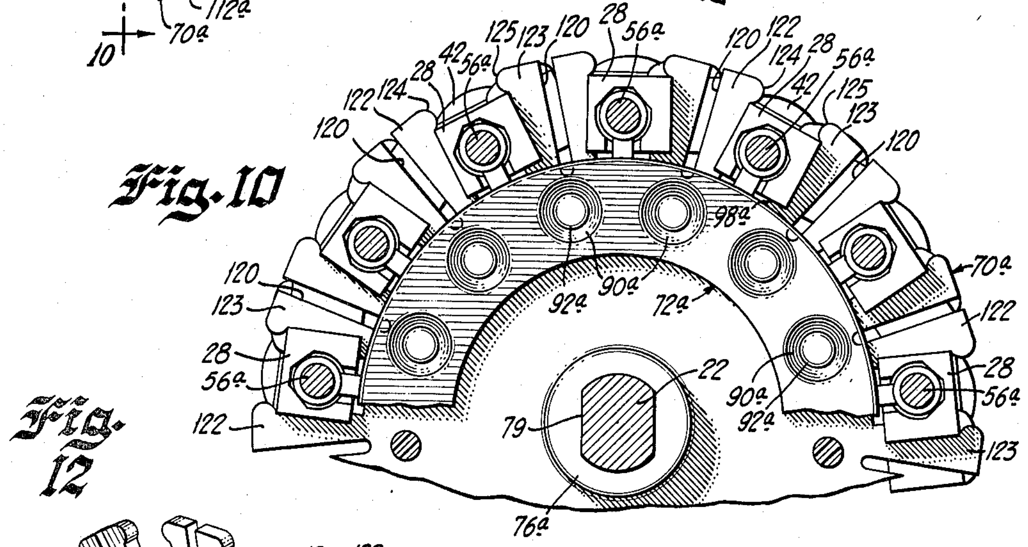
FIG. 10 is a sectional view taken along the lines 10—10 of FIG. 9.
Figure 12:
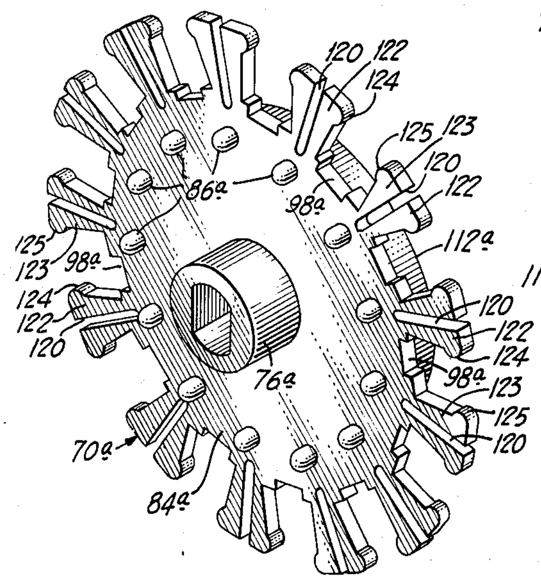
FIG. 12 is a perspective view of the combined positioning and stick retaining arrangement of FIG. 9.
Figure 11:
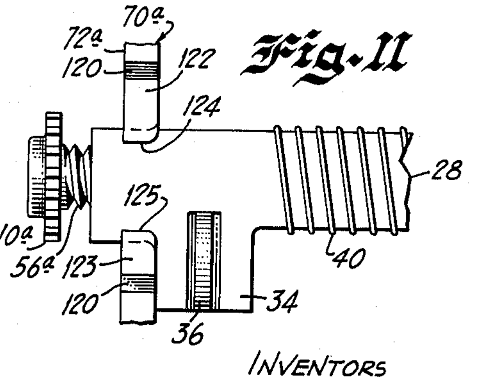
FIG. 11 is a fragmentary sectional view taken along the lines 11—11 of FIG. 9.
Figure 13:
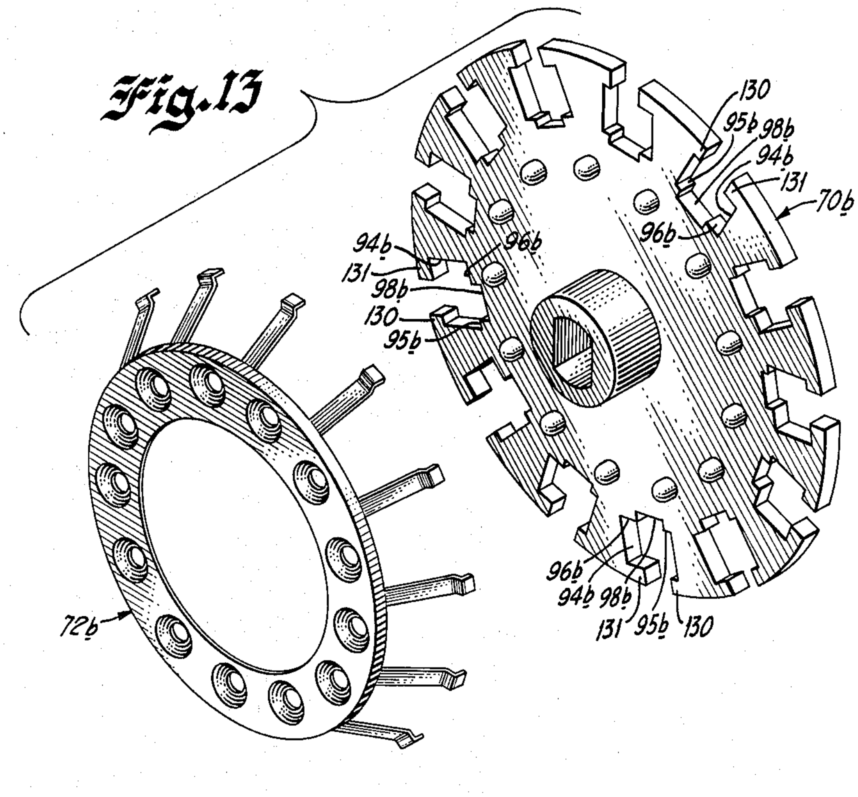
FIG. 13 is an exploded perspective view of an alternative tuning screw retaining arrangement according to the invention.
Figure 14:
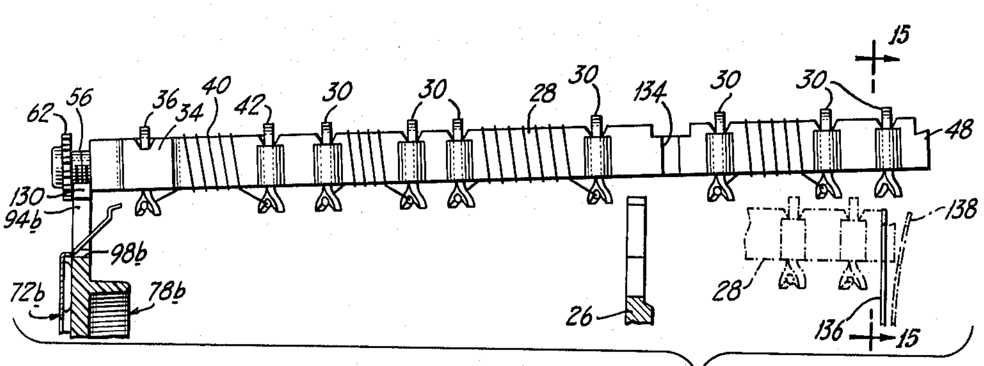
FIG. 14 is a fragmentary side elevational view of the retaining arrangement of FIG. 13 as used in a turret tuner.
Figure 15:
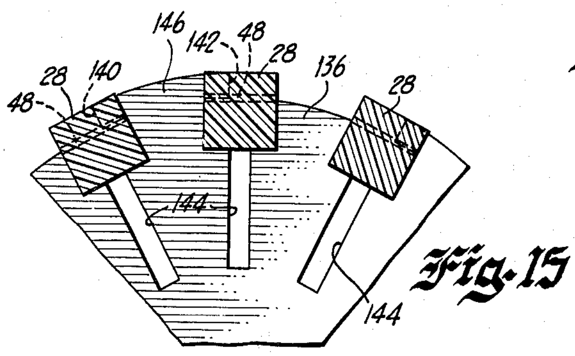
FIG. 15 is a sectional view taken along the lines 15—15 of FIG. 14.

In the embodiments described thus far the force exerted by the resilient arms 74 is opposed only by the retaining action of the shoulders 53 in the embodiment of FIG. 1, or the shoulders 124, 125 in the embodiment of FIG. 9. A more positive restraining arrangement is shown in the embodiment of FIGS. 13 to 15, inclusive. In this figure, the disc member 70*b* is employed together with the annular spring arm member 72*b*. The member 72*b* is identical to the member 72 described in detail in connection with the embodiment of FIG. 1. The disc member 70*b* is identical in many respects to the member 70 described heretofore. However, the member 70*b* is provided with a pair of inwardly directed shoulders 130 and 131 above each of the notches 84*b* which are arranged to receive the forward end of the tuning sticks 28. The opening between the shoulders 130 and 131 is just large enough to permit the shank of the oscillator adjustment screw 56 to pass therethrough. Accordingly, in the embodiment of FIGS. 13 to 15, inclusive, a tuning stick is inserted into the turrent assembly by first positioning the shank of the oscillator adjustment screw 56 over the opening between the shoulders 130 and 131 and then moving the forward end of the stick downwardly until the forward end of the stick can be passed into the opening 94*b* and rest on the shoulders 95*b* and 96*b*. This permits the stick 28 to be moved forwardly until the groove 134 (FIG. 14) therein is positioned over the peripheral notch in the positioning member 26. The rear end disc 136 is preferably made of flexible material so that it can be bent outwardly to the position shown in dotted lines at 138 in FIG. 14. Accordingly, when the disc 136 is moved outwardly beyond the end 48 of the tuning stick, the rear end of the tuning stick may be moved downwardly so that the groove 134 interlocks with the peripheral notch in the positioning member 26. After the rear end of the stick 28 is correctly positioned, the rear end disc 136 may be released and will assume the positions shown in full lines in FIG. 14 wherein it restrains the rear end of the stick from radially outward movement. If desired, the rear disc 136 may be provided with offset shoulder portions 140 and 142 (FIG. 15) which are positioned over the respective ends 48 of adjacent tuning sticks. Furthermore, deep radial slots 144 are provided in the rear end cap 136 so as to provide a resilient arm portion 146 which may be flexed outwardly to remove the shoulders 140 and 142 from two adjacent tuning sticks at once. Such an arrangement is shown and described in detail in the above identified Krepps and Weigel application and reference may be had thereto for further description of such a flexible end cap.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a television tuner of the turret type, a station selector shaft, a plurality of elongated members of insulating material, means for supporting said insulating members in an annular series about the axis of said shaft, an oscillator coil carried by each of said members, an adjustment screw for each of said coils and each arranged to be inserted into the corresponding coil to alter the inductance thereof, and a single disc secured to said shaft and provided with a plurality of integral spring arms formed integrally therewith and individually adapted to engage said adjustment screws and hold the same in adjusted position.

2. In a television tuner of the turret type, a station selector shaft, a plurality of elongated members of insulating material, means for supporting said insulating members in an annular series about the axis of said shaft, an oscillator coil carried by each of said members, an adjustment screw for each of said coils and each arranged to be inserted into the corresponding coil to alter the inductance thereof, a single disc secured to said shaft and provided with a plurality of spring arms formed integrally therewith and individually adapted to engage said adjustment screws and hold the same in adjusted position, and means for releasably securing said members in said supporting means so that said members can be individually removed together with the adjustment screw thereof without interference from said spring arms.

3. In a television tuner of the turret type, a station selector shaft, a plurality of elongated members of insulating material, means for supporting said insulating members in an annular series about the axis of said shaft, each of said members having means defining a hollow coil form and an oscillator coil wound about said coil form, an adjustment screw extending into each coil form for changing the inductance of each of said oscillator coils, a disc member secured to said shaft and having a plurality of integral spring arms, and means for positioning said disc so that said spring arms individually engage said adjustment screws beyond the end of the associated oscillator coil to hold the same in adjusted position.

4. In a television tuner of the turret type, a station selector shaft, a plurality of elongated members of insulating material, means for supporting said insulating members in an annular series about the axis of said shaft, an oscillator coil wound about each of said members near one end thereof, an aperture in each member extending inwardly from said end to a point beyond said oscillator coil, an adjustment screw extending into each of said apertures for changing the inductance of each of said oscillator coils, a disc member secured to said shaft and having a plurality of integral spring arms, and means for positioning said disc so that said spring arms individually engage said adjustment screws beyond the end of the associated oscillator coil to hold the same in adjusted position.

5. In a television tuner of the turret type, a station selector shaft, a plurality of elongated members of insulating material, means for supporting said insulating members in an annular series about the axis of said shaft, an oscillator coil wound about each of said members near one end thereof, an aperture in each member extending inwardly from said end to a point beyond said oscillator coil, an adjustment screw in each of said apertures for changing the inductance of each of said oscillator coils, a disc member secured to said shaft and having a plurality of spring arms, and means for positioning said disc so that said spring arms individually engage said adjustment screws to hold the same in adjusted position, said spring arms engaging said adjustment screws on the edge nearest said shaft, whereby said members can be individually removed without interference from said spring arms.

6. In a television tuner of the turret type, a station selector shaft, a plurality of elongated members of insulating material, means for supporting said insulating members in an annular series about the axis of said shaft, an oscillator coil wound about each of said members near one end thereof, an aperture in each member extending inwardly from said end to a point beyond said oscillator coil, an adjustment screw in each of said apertures for changing the inductance of each of said oscillator coils, means defining a slot in each member providing access to said aperture therein, a disc member secured to said shaft and having a plurality of spring arms, and means for positioning said disc so that said spring arms individually extend through said slots in said members and engage adjustment screws to hold the same in adjusted position, said spring arms engaging said adjustment screws on the edge nearest said shaft, whereby said members can be individually removed without interference from said spring arms.

7. In a television tuner of the turret type, a station selector shaft, a plurality of elongated members of insulating material, means for supporting said insulating members in an annular series about the axis of said shaft, an oscillator coil wound about each of said members near one end thereof, an aperture in each member extending inwardly from said end to a point beyond said oscillator coil and defining a pair of opposed bearing surfaces, an adjustment screw in each of said apertures for changing the inductance of each of said oscillator coils, means defining a slot in each member providing access to said aperture therein, a disc member secured to said shaft and having a plurality of spring arms, and means for positioning said disc so that said spring arms individually extend through said slots in said members and bias said adjustment screws against said opposed bearing surfaces.

8. In a television tuner of the turret type, a station selector shaft, a plurality of elongated members of insulating material, means for supporting said insulating members in an annular series about the axis of said shaft, an oscillator coil wound about each of said members near one end thereof, an aperture in each member extending inwardly from said end to a point beyond said oscillator coil and defining a pair of opposed bearing surfaces, an adjustment screw in each of said apertures for changing the inductance of each of said oscillator coils, means defining a slot in each member providing access to said aperture therein, a disc member secured to said shaft and having a plurality of spring arms, and means for positioning said disc so that said spring arms individually extend through said slots in said members and bias said adjustment screws against said opposed bearing surfaces, each of said spring arms having a crimp in the end portion thereof which acts as a mating thread for the associated adjustment screw to hold the same in adjusted position while permitting adjustment thereof to vary the inductance of the associated oscillator coil.

9. In a television tuner of the turret type, a station selector shaft, a plurality of elongated members of insulating material, means for supporting said insulating members in an annular series about the axis of said shaft, an oscillator coil wound about each of said members near one end thereof, an aperture in each member extending inwardly from said end to a point beyond said oscillator coil, an adjustment screw in each of said apertures for changing the inductances of each of said oscillator coils, a disc member secured to said shaft and having a plurality of peripheral notches within which said ends of said members are positioned, and an annular member secured to said disc and having a plurality of integral spring arms one for each of said adjustment screws, said spring arms being positioned individually to engage said adjustment screws to hold the same in adjusted position.

10. In a television tuner of the turret type, a station selector shaft, a plurality of elongated members of insulating material, means for supporting said insulating members in an annular series about the axis of said shaft, an oscillator coil wound about each of said members near one end thereof, an aperture in each member extending inwardly from said end to a point beyond said oscillator coil, an adjustment screw in each of said apertures for changing the inductance of each of said oscillator coils, means defining a slot in each member providing access to said aperture in a direction radially outwardly from said shaft, a disc member secured to said shaft and having a plurality of peripheral notches within which said ends of said members are positioned and an annular member secured to said disc and having a plurality of spring arms one for each of said adjustment screws, said spring arms being positioned between said shaft and said members and arranged to extend through said slots in said members and engage said adjustment screws to hold the same in adjusted position.

11. In a television tuner of the turret type, a station selector shaft, a plurality of elongated members of insulating material, means for supporting said insulating members in an annular series about the axis of said shaft, an oscillator coil wound about each of said members near one end thereof, an aperture in each member extending inwardly from said end to a point beyond said oscillator coil, an adjustment screw in each of said apertures for changing the inductance of each of said oscillator coils, a disc member secured to said shaft and having a plurality of peripheral notches within which said ends of said members are positioned, and an annular member secured to said disc and having a plurality of spring arms one for each of said adjustment screws, said spring arms being individually positioned to extend through said peripheral notches and engage said adjustment screws to hold the same in adjusted position.

12. In a television tuner of the turret type, a station selector shaft, a plurality of elongated members of insulating material, means for supporting said insulating members in an annular series about the axis of said shaft, an oscillator coil wound about each of said members near one end thereof, an aperture in each member extending inwardly from said end to a point beyond said oscillator coil, an adjustment screw in each of said apertures for changing the inductance of each of said oscillator coils, a disc member secured to said shaft and having a plurality of peripheral notches within which said ends of said members are positioned, an annular member having a plurality of integrally formed spring arms one for each of said adjustment screws, and means for securing said annular member to one face of said disc member with said spring arms extending through said notches and engaging said adjustment screws to hold the same in adjusted position.

13. In a television tuner of the turret type, a station selector shaft, a plurality of elongated members of insulating material, means for supporting said insulating members in an annular series about the axis of said shaft, an oscillator coil wound about each of said members near one end thereof, an aperture in each member extending inwardly from said end to a point beyond said oscillator coil, an adjustment screw in each of said apertures for changing the inductance of each of said oscillator coils, a disc member secured to said shaft and having a plurality of peripheral notches within which said ends of said members are positioned, said disc member having a projecting lug portion intermediate each of said notches, a flat annular member of resilient metal having a plurality of integrally formed spring arms extending outwardly from the periphery thereof at an angle thereto, said annular member having a plurality of apertured depressed portions positioned on said projecting lug portions to secure said annular member to one face of said disc member in spaced relation thereto, thereby to facilitate flexing of said spring arms, and means positioning said spring arms for individually engaging said adjustment screws to hold the same in adjusted position.

14. In a television tuner of the turret type, a station selector shaft, a plurality of elongated members of insulating material, a plurality of positioning discs spaced along said shaft and having peripheral notches therein adapted to receive said elongated members and support the same in an annular series about said shaft, an oscillator coil on each of said members, an adjustment screw mounted on each of said members and arranged to extend into the oscillator coil thereon to vary the inductance thereof, a disc member secured to said shaft and having a plurality of spring arms individually adapted to engage said adjustment screws and exert a radially outwardly directed bias thereon to hold the same in adjusted position, and means for retaining said members in said peripheral notches against the bias of said spring arms.

15. In a television tuner of the turret type, a station selector shaft, a plurality of elongated members of insulating material, a plurality of positioning discs spaced along said shaft and having peripheral notches therein adapted to receive said elongated members and support the same in an annular series about said shaft, an oscillator coil on each of said members, means on each of said members defining a pair of opposed bearing surfaces, an adjustment screw on each of said members which is seated on said bearing surfaces and arranged to extend into the oscillator coil thereon to vary the inductance thereof, a disc member secured to said shaft and having a plurality of spring arms individually adapted to engage said adjustment screws and exert a radially outwardly directed bias thereon to hold the same against said bearing surfaces in an adjusted position, and means for retaining said members in said peripheral notches against the bias of said spring arms.

16. In a television tuner of the turret type, a station selector shaft, a plurality of elongated members of insulating material, a plurality of positioning discs spaced along said shaft and having peripheral notches therein adapted to receive said elongated members and support the same in an annular series about said shaft, an oscillator coil on each of said members, an adjustment screw mounted on each of said members and arranged to extend into the oscillator coil thereon to vary the inductance thereof, a disc member secured to said shaft and having a plurality of spring arms individually adapted to engage said adjustment screws and exert a radially outwardly directed bias thereon to hold the same in adjusted position, one of said positioning discs having a means adjacent said peripheral notches therein for retaining said members in said notches against the bias of said spring arms.

17. In a television tuner of the turret type, a station selector shaft, a plurality of elongated members of insulating material, a plurality of positioning discs spaced along said shaft and having peripheral notches therein adapted to receive said elongated members and support the same in an annular series about said shaft, an oscillator coil on each of said members and adjustment screw mounted on each of said members and arranged to extend into the oscillator coil thereon to vary the inductance thereof, one of said positioning discs having an annular member mounted thereon and provided with integral spring arms individually adapted to engage said adjustment screws and exert a radially outwardly directed bias thereon to hold the same in adjusted position, and means for retaining said members in said peripheral notches against the bias of said spring arms.

18. In a television tuner of the turret type, a station selector shaft, a plurality of elongated members of insulating material, a plurality of positioning discs spaced along said shaft and having peripheral notches therein adapted to receive said elongated members and support the same in an annular series about said shaft, an oscillator coil on each of said members, an adjustment screw mounted on each of said members and arranged to extend into the oscillator coil thereon to vary the inductance thereof, one of said positioning discs having an annular member mounted thereon and provided with integral spring arms individually adapted to engage said adjustment screws and exert a radially outwardly directed bias thereon to hold the same in adjusted position, said one positioning disc having means adjacent said peripheral notches therein for retaining said members in said notches against the bias of said spring arms.

19. In a television tuner of the turret type, a station selector shaft, a plurality of elongated members of insulating material, a plurality of positioning discs spaced along said shaft, one of said discs having peripheral notches therein and the other of said discs having an annular series of apertures therein, said notches and said apertures being adapted to receive said elongated members and support the same in an annular series about said shaft, an oscillator coil on each of said members, an adjustment screw mounted on each of said members and arranged to extend into the oscillator coil thereon to vary the inductance thereof, said other disc including a plurality of radially extending spring arms individually adapted to engage said adjustment screws and exert a radially outwardly directed bias thereon to hold the same in adjusted position.

20. In a television tuner of the turret type, a station selector shaft, a plurality of elongated members of insulating material, a plurality of positioning discs spaced along said shaft, one of said discs having peripheral notches therein and the other of said discs having an annular series of apertures therein, said notches and said apertures being adapted to receive said elongated members and support the same in an annular series about said shaft, an oscillator coil on each of said members, an adjustment screw mounted on each of said members and arranged to extend into the oscillator coil thereon to vary the inductance thereof, said other disc including a plurality of radially extending spring arms individually adapted to engage said adjustment screws and exert a radially outwardly directed bias thereon to hold the same in adjusted position, said apertures in said other disc restraining said members against the bias of said spring arms.

References Cited by the Examiner

UNITED STATES PATENTS

| | | | |
|---|---|---|---|
| 2,868,982 | 1/1959 | Carlson | 334—51 |
| 3,022,674 | 2/1962 | Cross et al. | 334—51 |
| 3,058,075 | 10/1962 | Polley | 334—51 |

HERMAN KARL SAALBACH, *Primary Examiner.*

R. F. HUNT, *Assistant Examiner.*